United States Patent
Bolyukh (10) Patent No.: US 9,424,591 B2
(45) Date of Patent: *Aug. 23, 2016

(54) METHOD AND SYSTEM FOR PROVIDING INTERACTIVE ADVERTISEMENT CUSTOMIZATION

(71) Applicant: Verizon Patent and Licensing Inc., Arlington, VA (US)

(72) Inventor: Yuriy Bolyukh, Trophy Club, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/518,108

(22) Filed: Oct. 20, 2014

(65) Prior Publication Data

US 2015/0039430 A1  Feb. 5, 2015

Related U.S. Application Data

(63) Continuation of application No. 12/142,328, filed on Jun. 19, 2008, now Pat. No. 8,887,194.

(51) Int. Cl.
| | |
|---|---|
| H04N 7/10 | (2006.01) |
| H04N 5/445 | (2011.01) |
| G06Q 30/02 | (2012.01) |
| H04H 20/10 | (2008.01) |
| H04N 7/173 | (2011.01) |
| H04N 21/25 | (2011.01) |
| H04N 21/258 | (2011.01) |
| H04N 21/262 | (2011.01) |
| H04N 21/433 | (2011.01) |
| H04N 21/44 | (2011.01) |
| H04N 21/45 | (2011.01) |

(Continued)

(52) U.S. Cl.
CPC ........ *G06Q 30/0255* (2013.01); *G06Q 30/0203* (2013.01); *H04H 20/106* (2013.01); *H04H 60/375* (2013.01); *H04N 7/17363* (2013.01); *H04N 21/252* (2013.01); *H04N 21/25883* (2013.01); *H04N 21/26258* (2013.01); *H04N 21/4331* (2013.01); *H04N 21/44016* (2013.01); *H04N 21/4532* (2013.01); *H04N 21/4667* (2013.01); *H04N 21/812* (2013.01); *H04H 60/37* (2013.01); *H04H 60/46* (2013.01)

(58) Field of Classification Search
CPC ...................... H04N 21/4826; H04N 21/4756
USPC ..................................................... 725/35, 46
See application file for complete search history.

(56) References Cited

U.S. PATENT DOCUMENTS

| | | | |
|---|---|---|---|
| 5,446,919 A | 8/1995 | Wilkins | |
| 7,334,251 B2 * | 2/2008 | Rodriguez | G06Q 30/0242 348/E5.006 |

(Continued)

*Primary Examiner* — Pankaj Kumar
*Assistant Examiner* — Franklin Andramuno (57) ABSTRACT

A system and method may include providing a media stream via a network, the media stream comprising one or more advertisement content segments, identifying aggregate information associated with a viewer, assigning the one or more advertisement content segments to one or more categories and a category score associated with the one or more categories, filtering the one or more advertisement content segments based at least in part on the one or more categories, the category score associated with the one or more categories and the aggregate information associated with the viewer, and outputting the filtered one or more advertisement content segments to the viewer.

20 Claims, 7 Drawing Sheets

(51) Int. Cl.
*H04N 21/466* (2011.01)
*H04N 21/81* (2011.01)
*H04H 60/37* (2008.01)
*H04H 60/46* (2008.01)

(56) References Cited

U.S. PATENT DOCUMENTS

| | | | |
|---|---|---|---|
| 7,673,320 | B2 | 3/2010 | Abe et al. |
| 2002/0072971 | A1 | 6/2002 | Debusk et al. |
| 2003/0018659 | A1* | 1/2003 | Fuks ............... G06F 17/30646 715/230 |
| 2003/0093792 | A1 | 5/2003 | Labeeb et al. |
| 2003/0101451 | A1 | 5/2003 | Bentolila et al. |
| 2003/0126013 | A1 | 7/2003 | Shand |
| 2003/0229531 | A1 | 12/2003 | Heckerman et al. |
| 2004/0268387 | A1* | 12/2004 | Wendling ............ H04N 5/4401 725/35 |
| 2008/0013927 | A1* | 1/2008 | Kelly ................... G06Q 30/02 386/249 |
| 2008/0077494 | A1 | 3/2008 | Ozveren et al. |
| 2008/0250447 | A1* | 10/2008 | Rowe ................... G06Q 30/02 725/32 |
| 2009/0007195 | A1* | 1/2009 | Beyabani ............... H04N 7/163 725/86 |
| 2009/0030785 | A1 | 1/2009 | Goyal et al. |
| 2009/0197619 | A1* | 8/2009 | Colligan ............... G06Q 30/02 455/456.3 |
| 2009/0248672 | A1 | 10/2009 | McIntire et al. |
| 2009/0265227 | A1* | 10/2009 | Langford ............. G06Q 30/02 705/14.45 |

* cited by examiner

Viewer Identification Information

Viewer Personal Information

Name:

Address:

Age:                              Gender:

Education:

Profession:

Income:                                            Retain data for [30] days.

Viewer Interests:

| | | | | | |
|---|---|---|---|---|---|
| ☑ | Shopping | ☐ | Baseball | ☐ | Food |
| ☑ | Hiking | ☐ | News | ☐ | Restaurant |
| ☐ | Fishing | ☑ | Gardening | ☑ | Beverages |
| ☐ | Camping | ☐ | Car | ☑ | Health |
| ☐ | Football | ☑ | Electronics | ☐ | Medicine |
| ☐ | Basketball | ☐ | Finance | | Others [    ] |

Rating Advertisement

Rating Score

0 — 40 —×— 100

Least Favorite   Most Favorite

Filtered Advertisements

☑ False Positive

Retain data for [30 ▲▼] days.
Time Period To Retain Advertisement Rating

Filtering Options

☑ Automatic Filtering Advertisement Content

☑ Viewer Filtering Advertisement Content

☐ Filter Off

METHOD AND SYSTEM FOR PROVIDING INTERACTIVE ADVERTISEMENT CUSTOMIZATION

CROSS REFERENCE TO RELATED APPLICATION

The subject application is a Continuation Application of U.S. application Ser. No. 12/142,328, filed Jun. 19, 2008, which is hereby incorporated by reference in its entirety.

BACKGROUND INFORMATION

Many advertisers use television to advertise their products and services. Some viewers, however, feel bombarded and may avoid watching advertisements broadcast during television programs or may watch television programs that have fewer or no commercials (e.g., HBO). Currently, advertisements are shown on television have many flaws mainly because advertisements are not targeted according to preferences of the viewer. For example, a female hygiene product may be repeatedly shown to a male viewer during a sporting program. Therefore, viewers have adopted strategies to avoid watching non-interested advertisements in a television program, such as leaving the room, changing channels, and deleting commercials using digital video recorders. Thus, advertisers may waste precious airtime and displaying the advertisements to uninterested viewers.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

The system and method may filter a media stream to provide one or more media contents from the media stream to one or more viewers based at least in part on identification information and/or feedback from the one or more viewers. The one or more media contents may include one or more programming content segments (e.g., a television program such as CSI, American Idol, Law & Order) and/or one or more advertisement content segments (e.g., electronics, food, beverage commercials). For example, the system and method may examine characteristics associated with the one or more media contents to categorize each of the content segments. The system and method may examine various identification information associated with one or more viewers and/or feedback information from the one or more viewers to categorize the one or more viewers. Thereafter, the system and method may filter the media segments to the one or more viewers by comparing the categorization of the media segments with the categorization of the one or more viewers. In addition, the system and method may calculate a probability whether the one or more viewers may want to view the media segments, and provide the media segments to the one or more viewers in the event that the probability may be above a predetermined threshold value, as will be discussed in greater detail below.

The description below describes servers, set top boxes, presentation devices, and network elements that may include one or more modules, some of which are explicitly shown, others are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. The functions described as being performed at various components may be performed at other components, and the various components may be combined and/or separated. Other modifications also may be made.

Figure 1:
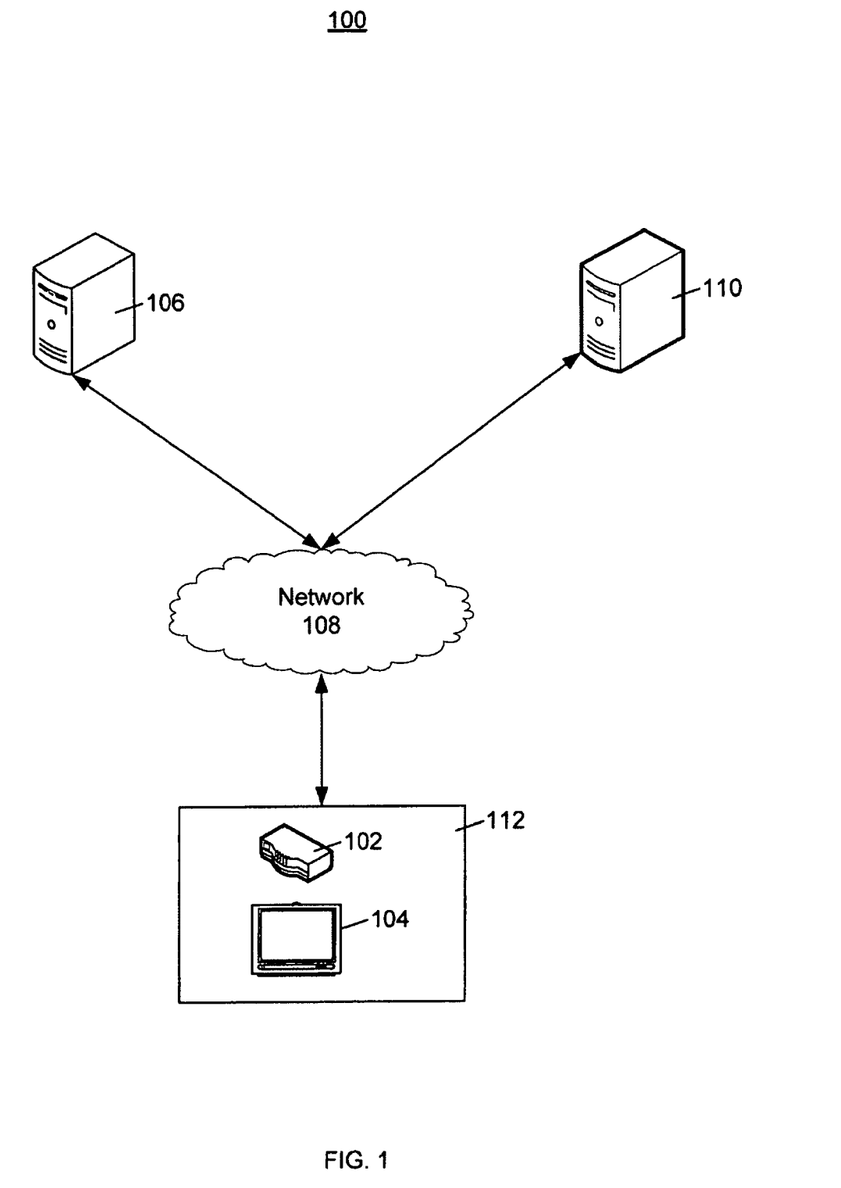
FIG. 1 illustrates a system for interactively shaping advertisements in a media stream in accordance with exemplary embodiments.

FIG. 1 illustrates a system for interactively shaping advertisement in a media stream in accordance with exemplary embodiments. In an exemplary embodiment, the system 100 may include a set top box 102, a display device 104, a content provider 106, a network 108, a viewer server 110, and a customer premise 112. The customer premise 112 may include a residence, a building and/or other structures that includes the set top box 102 and/or the display device 104. It is noted that system 100 illustrates a simplified view of a media delivery system, and other hardware devices and software not depicted may be included in the system 100. It is also noted that the system 100 illustrates only a single set top box 102, a single display device 104, a single content provider 106, a single network 108, a single viewer server 110, and a single customer premises 112. It will be appreciated that multiple instances of these devices may be used. Moreover, the system 100 may include other devices not depicted in FIG. 1.

The content provider 106 may provide a media stream having one or more media contents to the customer premises 112 via the network 108. Additionally, the one or more media contents may include one or more programming contents and/or one or more advertisement contents. The one or more programming contents may be presented as a television program, to one or more viewers at the customer premises 112. The one or more advertisement contents may be presented as commercials, to one or more viewers at the customer premise 112. The one or more advertisement contents may be presented in between the one or more programming content segments. The customer premises 112 may include a set top box 102 communicatively coupled to the network 108, and a display device 104 communicatively coupled to the set top box 102. The set top box 102 may process the one or more media contents for causing display of the one or more programming contents and/or the one or more advertisement contents at the display device 104. It is noted that the set top box 102 and the display device 104 are illustrated as separate devices in FIG. 1. However, the set top box 102 and the display device 104 may be combined into a single device. The display device 104 may be a device for displaying the one or more media contents. For example, the display device 104 may be a computer, a television set, or other devices capable of displaying video and/or text. The set top box 102 may filter the one or more advertisement contents based at least in part on identification information and/or feedback information associated with one or more viewers located at the customer premises 112.

The content provider 106 may include a radio company, a cable company (e.g., Cox Communication, Comcast Corp, and/or Adelphia Communication Corp), a satellite company (e.g., DirecTV and/or Dish Network), a broadcasting company (e.g., National Broadcasting Company (NBC), American Broadcasting Company (ABC), Fox Broadcasting Company (FOX), and/or Columbia Broadcasting System (CBS)) and/or other television broadcasting companies.

A content provider 106 may provide media contents over the network 108. The network 108 may be a wired network, a wireless network, or a combinations thereof. For example, the network 108 may deliver the media contents via a satellite network, a cable television network, an antenna, an optical fiber, a coaxial cable, or other manners of transporting a media stream. The media contents may be in analog or digital and may include audio, video, text, and/or combinations thereof. The media contents may be, for example, a cable television contents, or may be digitized audio contents, video contents, text contents, etc., transported across the network 108 (e.g., in a computer network, transported in Internet Protocol packets via the Internet). The media contents also may include one or more media contents for different channels (e.g., different television channels).

The one or more programming contents may include one or more programming content segments, and the one or more advertisement contents may include one or more advertisement content segments. Each programming content segment and/or advertisement content segment may have a varying duration. The programming content segments may be categorized by one or more characteristics associated with the programming. For example, the one or more characteristics associated with the programming content segments may include at least one of sitcom, drama series, sporting, reality television, science programming, news programming, culinary programming, language, gender, age, actors/actresses, comedy and/or other characteristics to identify the programming. The one or more advertisement content segments may be categorized by one or more characteristics associated with the advertisements. For example, the one or more characteristics associated with the advertisement including at least one of product type (e.g., food, beverage, medicine, electronics), service type, gender, age, actor/actress, interaction between actors/actresses, music style, humor, language, senses (e.g., smell, taste, sight, touch, sound), sporting, reality, culinary, and/or other characteristics to identify the advertisements.

The set top box 102 may filter the media stream based at least in part on the characteristics associated with the media stream and display the filtered media stream at the display device 104. Filtering of the media stream is discussed in further detail below. In addition to filtering the media stream, the set top box 102 may provide identification information and/or feedback information associated with one or more viewers, located at the customer premise 112, to the viewer server 110 via the network 108. For example, the identification information associated with the one or more viewers located at the customer premises 112 may include at least one of name, address, payment method, biometric information, age, gender, areas of interest, geographic location, income level, habits, education level and/or other information to identify one or more viewers. Also, feedback information associated with the one or more viewers located at the customer premises 112 may include at least one of viewing habits, rating of programming contents, rating of advertisement contents, preferences and/or other feedback information provided by the viewers.

The viewer server 110 may store and/or aggregate the viewer information which may include the identification information and/or the feedback information associated with the one or more viewers within the viewer server 110. Also, the viewer server 110 may provide the aggregate viewer information to the set top box 102 and filter the media stream based at least in part on the aggregate viewer information associated with the one or more viewers. The viewer server 110 may also include one or more processors for analyzing the identification information and/or the feedback information associated with the one or more viewers and may aggregate viewer information on the viewers.

Figure 2:
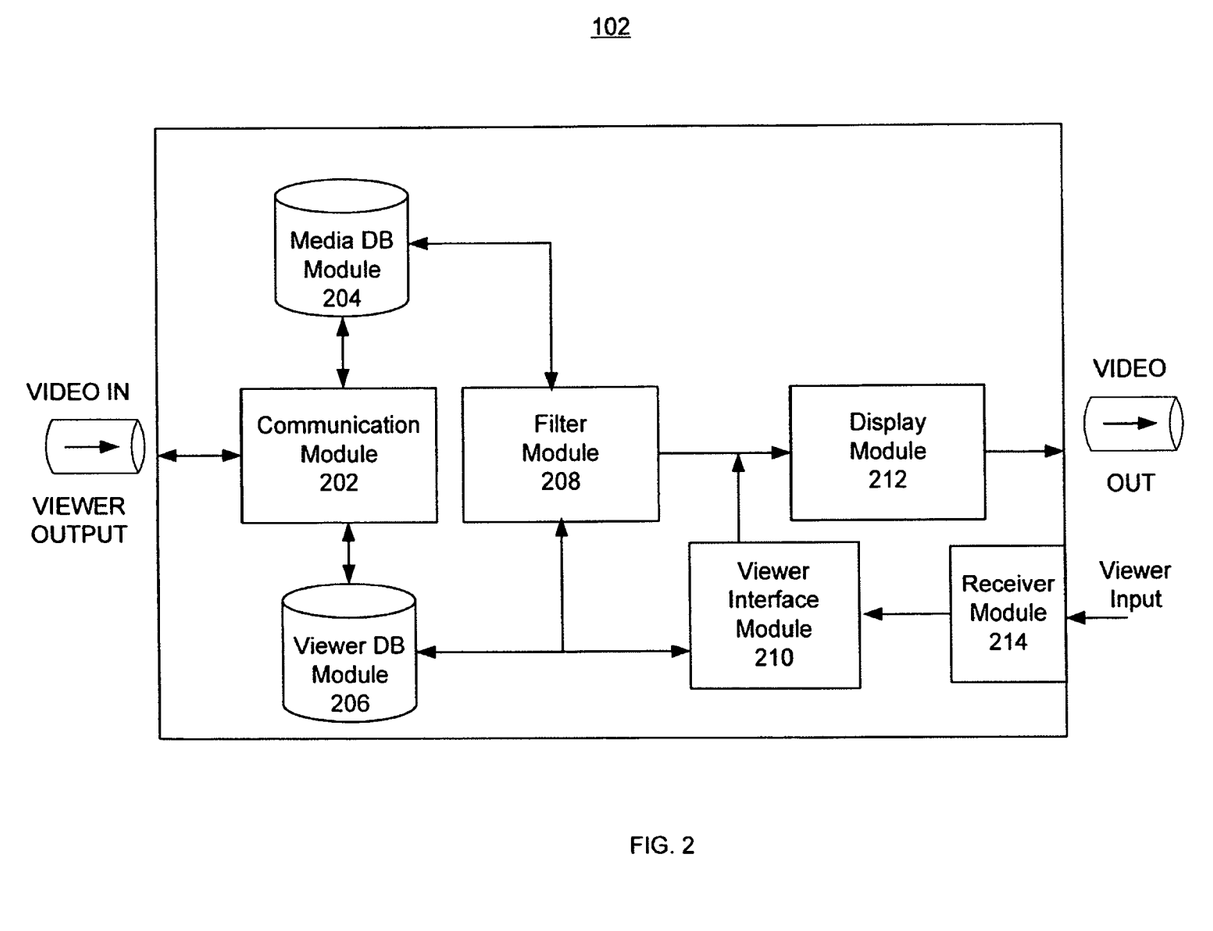
FIG. 2 illustrates various modules of a set top box for interactively shaping advertisements in a media stream in accordance with exemplary embodiments.

FIG. 2 illustrates various modules of a set top box for interactively shaping advertisements in a media stream in accordance with exemplary embodiments. The set top box 102 may examine various characteristics of each media content segment in the media stream and may categorize the media content segments based at least in part on the characteristics associated with each media content segments. The set top box 102 may apply a filter to the media stream based at least in part on the characteristics for each media content segments and/or the aggregate viewer information associated with one or more viewers associated with the set top box 102. For example, the content provider 106 and/or the set top box 102 may assign one or more categories/category scores associated with media contents. The set top box 102 may compare the one or more categories/category scores associated with each media content segments with the aggregate viewer information associated the one or more viewers. In the event that the one or more categories/category scores associated with the media content segments matches the aggregate viewer information associated with the viewer, the set-top box 102 may provide such media content segments to be displayed by the display device 104. Also, the set top box 102 may remove and/or replace one or more media content segments from the media stream having one or more categories/category scores that may not match the aggregate viewer information associated with the one or more viewers.

In an exemplary embodiment, the set top box 102 may include a communication module 202, a media database module 204, a viewer database module 206, a filter module 208, a viewer interface module 210, a display module 212 and a receiver module 214. It is noted that the modules 202, 204, 206, 208, 210, 212, and 214 are exemplary and the functions performed by one or more of the modules may be combined with that performed by other modules. The functions described herein as being performed by the modules 202, 204, 206, 208, 210, 212, and 214 also may be separated and may be performed by other modules at devices local or remote to the set top box 102.

The set top box 102 may communicate with the content provider 106 and/or the viewer server 110 via the communication module 202. For example, the communication module 202 may receive a media stream from the content provider 106 via the network 108. Also, the communication module 202 may receive the aggregate viewer information associated with the one or more viewers from the viewer server 110 via the network 108. Further, the communication module 202 may transmit identification information and/or feedback information associated with one or more viewer to the viewer server 110. The communication module 202 may include any communication devices capable of transmitting and/or receiving information across the network 108.

In an exemplary embodiment, the communication module 202 may receive the media stream from the content provider 106. The media stream may be continuous and/or intermittent media stream and may include one or more programming contents segments and/or one or more advertisement content segments. The one or more programming contents segments and the one or more advertisement contents segments may be separately transmitted to the communication module 202. Also, the one or more programming contents segments may be interwoven with the one or more advertisement content segments and transmitted at random order to the communication module 202. For example, the content provider 106 may transmit 3 programming content segments followed by 4 advertisement content segments, and/or 5 programming content segments and 8 advertisement content segments. The one or more programming content segments may include one or more television programs (e.g., news, sporting events, reality television, drama series, comedy series etc.) for one or more channels. The one or more advertisement content segments may be advertisements associated with one or more advertisers for display to one or more viewer during an advertisement break of the one or more programming. The one or more advertisement content segments may be categorized by the content provider 106 based at least in part on product type, service type, gender, age, actor/actress, interaction between actors/actresses, music style, humor, language, senses, sporting, reality television, culinary, and/or other characteristics to identify the advertisements. Also, the one or more advertisement content segments may be categorized by the one or more advertisers based on the one or more factors described above. For example, the content provider 106 may assign a media identification (e.g., name, number, channel, time slot) to the one or more advertisement content segments to effectively identify the one or more advertisement segments. Also, the content provider 106 may assign one or more categories (e.g., product, age, gender, etc) to the one or more advertisement segments. In addition, a plurality of categories may apply to the one or more advertisement content segments, therefore the content provider 106 may assign a score to each of the plurality of categories to illustrate the weight of the categories. For example, on a scale of zero to one hundred, zero being the least relevant and one hundred being the most relevant, the content provider 106 may assign a ninety to the female category for a female hygiene product advertisement and may assign a ten to the male category.

The communication module 202 may transfer the media stream to the media database module 204. The media database module 204 may process the media stream before transmitting the media stream to the filter module 208. For example, the media database module 204 may store the media stream for a predetermined period of time. For example, the media database module 204 may store the media stream for a second, a minute, an hour, a day etc, before discarding the media stream. The media database module 204 may buffer a certain number of media content segments in the media stream before forwarding the media stream to the filter module 208. Also, the media database module 204 may separate the programming content segments from the advertisement content segments based at least in part on the media identification. For example, the media identification for the programming content segments may be designated by a letter P, while the media identification for the advertisement content segments may be designated by a letter A. Therefore, the advertisement content segments may be filtered by the filter module 208 before being displayed to the viewer via the display device 104. The media database module 204 may sort the advertisement content segments based at least in part on the one or more categories associated with the advertisement content segments and/or the categories scores. For example, an advertisement content segment may be associated with the sports category having a category score of eighty and the comedy category having a category score of fifty. The media database module 204 may sort the advertisement content segment by sports category as the primary category and the comedy category as the secondary category. In the event that an advertisement content segments may be associated with more than two categories, the media database module 204 may sort the advertisement content segment based at least in part on the category scores. Further, in the event that two or more categories have the same score, the media database module 204 may sort the advertisement content segment sequentially, randomly and/or other sorting method. Also, the one or more advertisement content segments may be categorized as test advertisement content segment. For example, the test advertisement content segment may include new advertisement content segments that the viewer may not seen before. The media database module 204 may provide the test advertisement content segments to the filter module 208.

The communication module 202 may receive the aggregate viewer information associated with the one or more viewers located at the customer premises 112 from the viewer server 110. For example, the one or more viewers may assign one or more categories and/or category scores by the viewer server 110 based at least in part on the identification information and/or the feedback information as described above. Additionally, a plurality of categories may be associated with the one or more viewers and therefore the viewer server 110 may assign a score to each category of the plurality of categories to illustrate the weight of the categories. For example, on a scale of zero to one hundred, zero being the least relevant and one hundred being the most relevant, the viewer server 110 may assign an eighty-five to the sports category for a viewer who is interested in sports and may assign a ten to the gardening category for the viewer who is not interested in gardening. Furthermore, one or more categories associated with the one or more viewers may be updated periodically by the feedback information provided by the one or more viewers. For example, the one or more viewers may rate the one or more advertisement content segments and the ratings may be used to update the categories and/or category scores associated with the one or more viewers. Additionally, a plurality of viewers (e.g., adults and children) may be located at the customer premises 112. A viewer identification information may be assigned to each of the plurality of viewers. The viewer identification information may include a viewer name, a viewer number, a viewer password and/or other identification to distinguish between the plurality of viewers.

The communication module 202 may transmit the one or more categories and/or category scores associated with the one or more viewers located at the customer premises 112 to the viewer database module 206. The viewer database module 206 may store the one or more categories and/or category scores associated with the one or more viewers for a predetermined period of time. For example, the viewer database module 206 may store the viewer identification information, which may include customer specific traits may be, such as, but not limited to, information on a viewer's gender, age (e.g., adult, child, etc.), ethnicity, interests, demographic information, combinations thereof, and/or other information about the viewer. Also, the viewer database module 206 may update the one or more categories and/or category scores associated with the one or more viewers from the feedback information provided by the one or more viewers. The viewer database module 206 may provide the feedback information to the viewer server 110 via the communication module 202.

Also, the viewer database module 206 may sort the one or more categories associated with the one or more viewers based at least in part on the category scores. For example, one or more viewers may be associated with the sports category having a score of eighty, the comedy category having a score of fifty and/or the age category of ages 22-35. The viewer database module 206 may place the sports category ahead of the comedy category because the sports category has a higher category score. The viewer database module 206 may provide the one or more categories and/or category scores associated with the one or more viewers to the filter module 208.

The filter module 208 may receive one or more advertisement content segments from the media database module 204 and/or one or more categories/category scores associated with the one or more viewers from the viewer database module 206. The filter module 208 may include one or more processors to match one or more categories associated with the advertisement content segments with the one or more categories associated with the one or more viewers, thus allowing the one or more viewers to filter the advertisements displayed to the one or more viewers. For example, as described above, an advertisement content segment may be associated with the sports category having a category score of 8 and the comedy category having a category score of 5. Also, one or more viewers may be associated with the sports category having a score of 8, the comedy category having a score of 5 and/or the age category of ages 22-35. Thus, the filter module 208 may provide the one or more viewers with the advertisement content segment. More specifically, an advertisement content segment may depict multiple horses waiting to play football while a zebra is reviewing a previous play. The advertisement content segment may be categorized in the sports category having a score of eighty and/or the comedy category having a score of fifty. The filter module 208 may provide the advertisement content segment to the one or more viewers associated with the sports category and/or comedy category. While the filter module 208 may block an advertisement content segment depicting a semi-annual sale for woman's shoes to the one or more viewers associated with the sports category and/or the comedy category. The filter module 208 may implement one or more matching algorithms (e.g., string matching algorithms) that may be capable of matching one or more categories of advertisement content segments to the one or more categories and/or category scores associated with the one or more viewers.

Also, the filter module 208 may calculate the probability of whether the one or more viewers may want to view each advertisement content segments. The filter module 208 may apply one or more statistical analysis (e.g., Bayesian algorithms) to calculate the probability of whether the one or more viewers may want to view the advertisement content segments. For example, the filter module 208 may include a threshold probability value wherein the calculated probability for the advertisement content segment is above the threshold probability value, the advertisement content segment may be shown to the viewer. However, in the event that the calculated probability for the advertisement content segment is below the threshold probability value, the advertisement content segment may not be shown to the viewer. The threshold probability value may be based at least in part on input received from the viewer indicating how aggressive the viewer desires the filter module 208 to filter the media stream for relevant advertisements. The threshold probability value may be selected by one or more viewers. If the threshold probability value is not specified by the viewer, the filter module 208 may use a default setting for the threshold probability value.

The filter module 208 may determine/receive a preset of one or more categories/category scores associated with the one or more viewers based at least in part on the aggregate viewer information. For example, a viewer may identify himself as a male in the age group of 20-25, the filter module 208 may determine a preset of one or more categories/category scores associated with the viewer. Also, it may be appreciated by one of skilled in the art that determining a preset of one or more categories/category scores may be performed at the viewer server 110 and/or the viewer database module 206. The one or more categories/category scores associated with the viewer may include at least one of male category, age group category, sports category, outdoors category, electronic category and hunting category. Therefore, the filter module 208 may block an advertisement content segment depicting a drug that lowers blood pressure for men at an ages of 55 and above. The filter module 208 may display one or more advertisement content segments associated with the preset of categories/category scores. The viewer may provide feedback information associated with the one or more advertisement content segments. For example, the viewer may rate the advertisement content segments on a scale zero to one hundred, as described above. Specifically, the advertisement content segments associated with hunting category, electronic category and sports category may be viewed by the viewer. The viewer may rate the advertisement content segment associated with the hunting category with a fifteen, the advertisement content segment associated with the sports category with an eighty and the advertisement content segment associated with the electronics category with a fifty. The filter module 208 may update the preset categories and that the viewer may no longer associated with the hunting category and the viewer may be shown more advertisement content segments associated with the sports category than the advertisement content segments associated with the electronics category.

The filter module 208 may provide test advertisement content segments to the viewer. The test advertisement content segments may be associated with one or more categories that may not be associated with the preset categories/category scores. For example, the test advertisement content segments may be associated with at least one of the gardening category, housing category, alcohol category, etc. The viewer may rate the gardening category as a 10, housing category as an eighty and the alcohol category as a forty. The filter module 208 may update the preset categories associated with the viewer to include housing category and/or alcohol category while eliminating one or more advertisement content segments associated with the gardening category. Thus, the preset categories may be updated periodically (e.g., hourly, daily, weekly, etc) or may be triggered by a viewer's response. By updating the preset categories the viewer may be provided with one or more advertisement content segments that may be most interested to the viewer.

The filter module 208 may prevent children from seeing inappropriate advertisements and/or programs (e.g., violence, adult material, etc.), men from seeing advertisements targeted for women, etc. This also may permit advertisers to provided targeted delivery of advertisements.

The filter module 208 may determine that two media content segments may be similarly processed if some or all of the category scores of the two media content segments vary from one another by less than a predetermined variance amount. In an exemplary embodiment, the filter module 208 may determine that two media content segments are similar if the two media segments have the same category scores. Also, the filter module 208 may determine that two media content segments are similar based on comparing one or more categories/category scores each of the two media segments. The filter module 208 may determine that the two media content segments are similar if the media content segment category scores differ by less than the predetermined variance amount. In an exemplary embodiment, a first media content segment may have a high category score while the second media content segment may have a low category score. The filter module 208 may calculate the difference of the category scores between the first media content segment and the second media content segment. Also, the filter module 208 may determine whether the difference between the first media content segment and the second media content segment may fall within the predetermined variance amount. In the event that the difference between the first media content segment and the second media content segment falls within the predetermined variance amount, the filter module 208 may conclude that the first media content segment and the second media content segment are similar. Also, in the event that that the difference between the first media content segment and the second media content segment does not fall within the predetermined variance amount, the filter module 208 may conclude that the first media content segment and the second media content segment are not similar. Moreover, in the event that the filter module 208 concludes the first media content segment and the second media content segment are similar, the filter module 208 may process the first media content segment and the second media content segment in a similar manner. In addition, in the event that the filter module 208 concludes that the first media content segment and the second media content segment are not similar, the filter module 208 may not process the first media content segment and the second media content segment in a similar manner.

The filter module 208 may assign weight to one or more categories/category scores associated with the one or more advertisement content segments. For example, the filter module 208 may assign equal weight to the one or more categories/category scores. In other examples, the filter module 208 may assign unequal weight to the one or more categories/category scores. The assigned weight of the one or more categories/category scores may be set to an initial value. Also, the assigned weight of the one or more categories/category scores may change over time based at least in part on the feedback information provided by the viewer. For example, an advertisement content segment may have a beverage category score of 50, a sports category score of 70 and a comedy category score of 80. Initially, the filter module 208 may distribute the weight equally among each category/category score. The viewer may provide the feedback information to the filter module 208 via the view interface module 210 over a period of time and the feedback information may be stored in the viewer database module 206. The viewer database module 206 may determine that the viewer prefer sports category over comedy category and then beverage category based at least in part on the feedback information provided by the viewer. The viewer database module 206 and/or the filter module 208 may assign fifty percent of the weight to the sports category, thirty percent of the weight to the comedy category and twenty percent of the weight to the beverage category.

The filter module 208 may apply filtering based on one or more advertisement content segments being categorized based at least in part on one or more categories/category scores associated with the one or more advertisement content segments. For example, the filter module 208 may compute a probability that a viewer may want to view one or more advertisement content segments. In the event that the calculated probability for the one or more advertisement content segments is above a predetermined threshold probability, then filter module 208 may allow the one or more advertisement content segments to be displayed to the viewer. However, in the event that the calculated probability for the one or more advertisement content segments is below the predetermined threshold probability, then the filter module 208 may block the one or more advertisement content segments to be displayed to the viewer. The filter module 208 may replace the blocked one or more advertisement content segments with one or more advertisement content segments having a probability that is above the predetermined threshold probability.

The filter module 208 may create a multi-dimensional probability distribution function (pdf) for one or more viewers. The filter module 208 may provide one or more default probability distribution function (pdf) for one or more viewers based at least in part on gender, age, geographical location, service provided and/or other viewer characteristics known to the content provider 106. For example, the filter module 208 may provide a disparate default probability distribution function (pdf) for male and female. The male default probability distribution function (pdf) may be based at least in part on sports category, comedy category, cars category, electronics category and/or other categories that a male may be generally interested. The female default probability distribution function (pdf) may be based at least in part on shopping category, food category, gardening category, jewelry category, baby category and/or other categories that a female may be generally interested. Also for example, the filter module 208 may provide default probability distribution function (pdf) for viewers of different age groups. A default probability distribution function (pdf) associated with viewers in the age group of 5-10 may be based at least in part on toy category, cartoon category, game category, education category, and/or other categories that a viewer in the 5-10 age group may be interested. A default probability distribution function (pdf) associated with viewers in the age group of 65-75 may be based at least in part on medication category, health category, supplement category, nursing category, and/or other categories that a viewer in the 65-75 age group may be interested.

The default probability distribution function (pdf) may be revised, redefined, and/or updated based at least in part on feedback information provided by the viewer. For example, the feedback information may include information provided by the viewer and the identification information may be prompted by the content provider 106 during an initial set up process, which will be described later in detail. Also, the feedback information may include a rating of one or more advertisement content segments provided by the viewer which will be described below in detail. The identification information may include one or more personal information associated with one or more viewers which will be described below in detail. Over time, as the viewer rate more advertisement content segments the default probability distribution function (pdf) may be revised, redefined, and/or updated to more accurately reflect the preferences of the viewer. The filter module 208 may utilize the revised probability distribution function (pdf) to more accurately calculate the likelihood that a viewer will want to view one or more advertisement content segments. In an exemplary embodiment, an advertisement content segment may be associated with health care category, medical category, and nursing category. The probability distribution function (pdf) associated with a viewer may be based at least in part on supplement category and/or nursing category. The viewer may view the advertisement content segment and may rate the advertisement content segments with a rating of 85 to the filter module 208. The filter module 208 may update a default and/or a previous probability distribution function (pdf) using at least in part on the rating provided by the viewer. The updated probability distribution function (pdf) may incorporate one or more categories (e.g., health care category and/or medical category) associated with the advertisement content segment. Also, the updated probability distribution function (pdf) may change a weight distribution among the one or more categories based at least in part on the rating provided by the viewer.

Furthermore, the filter module 208 may enable a viewer to control a shaping of one or more advertisement content segments. For example, the filter module 208 may enable the viewer to determine the categories associated with the probability distribution function (pdf). Also, the filter module 208 may enable a viewer to select one or more categories associated with the one or more advertisement content segments to be displayed to the viewer. Furthermore, the filter module 208 may enable a viewer to select one or more advertisement content segments that are viewed the most.

Moreover, the filter module 208 may designate one or more advertisement content segments as "test advertisement" and/or "new advertisement." For example, the content provider 106 and/or the media database module 204 may assign a "test advertisement" identifier and/or a "new advertisement" identifier associated with one or more advertisement content segments. The filter module 208 may detect the "test advertisement" identifier and/or the "new advertisement" identifier may allow the one or more test and/or new advertisement content segments to be displayed to a viewer. Also, the filter module 208 may allow one or more advertisement content segments associated with one or more categories that may not have been displayed to the viewer in order to expose the viewer to new advertisement content segments and/or categories.

The filtered advertisement content segments may be advertisement content segments within the media stream that satisfies the filter module 208. The filter module 208 may communicate the filtered advertisement content segments to the display module 212. The display module 212 may cause the display of the media stream (i.e., programming content segments and the filtered advertisement content segments) and various user interfaces at the display device 104.

Referring again to FIG. 1, the system 100 may be set up to transport programming content signals and advertisements content signals to the set top box 102 in various ways. In an exemplary embodiment, the programming content signals and the advertisement content signals may be broadcast. Broadcasting may imply that the content provider 106 sends the programming content signals and the advertisement content signals to the users at predefined times to any number of set top boxes 102 tuned in to a particular channel or channels. In this example, the set top box 102 may filter the advertisement content signals as they are received. The set top box 102 may communicate with the content provider 106 at predefined intervals as opposed to having a continuous connection. In another exemplary embodiments, the filtering may occur at the content provider 106 as opposed to at the set top box 102. In this example the viewer identification information and the viewer feedback information may be communicated from the set top box 102 to the content provider 106 and the content provider 106 may filter the advertisement signals before sending the advertisement signals to the set top box 102. Moreover, the content provider 106 may provide one or more disparate filtered advertisement signals to one or more television channels.

To set up filtering of the media stream, the set top box 102 may present a graphical user interface to prompt the viewer for identification information and/or feedback information on how to filter the media stream. The viewer interface module 210 of the set top box 102 may cause the display of a graphical user interface to prompt the viewer to input information to initialize, set up, provide feedback information, rate of one or more advertisement content segments and/or modify the filter module 208. The viewer interface module 210 may prompt the viewer to select one or more options associated with the filter module 208 to filter the media stream for interested advertisements, and how to respond to feedback information received from the viewer. In an exemplary embodiment, a receiver module 214 may receive a feedback signal including feedback information for identifying selections of the viewer's preferences and/or interests. The viewer database module 206 may store the viewer's preferences and/or interests. Also, the feedback information provided by the viewer may be transmitted to the viewer server 110 via the communication module 202.

Figure 3:
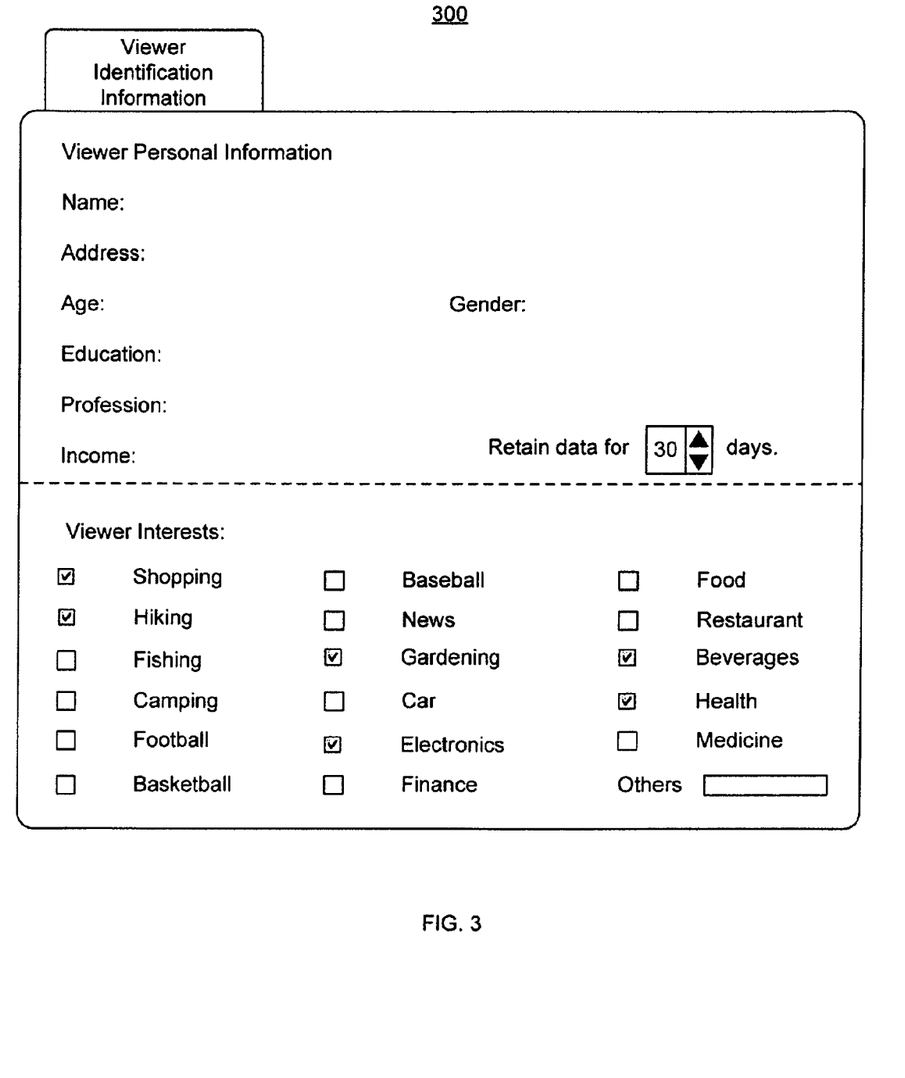
FIG. 3 illustrates a graphical user interface for soliciting a viewer identification information in accordance with exemplary embodiments.

FIG. 3 illustrates a graphical user interface to solicit a viewer identification information in accordance with exemplary embodiments. The viewer interface module 210 may present the graphical user interface 300 to prompt the viewer to input viewer identification information. The viewer identification information may be received by the receiver module 214 and transmit the viewer identification information to the viewer database module 206 via the viewer interface module 210. Also, the viewer identification information may be transmitted to the filter module 208 via the viewer interface module 210. The filter module 208 may filter one or more advertisement content segments to be displayed to the viewer based at least in part on the viewer identification information. In an exemplary embodiment, the graphical user interface 300 may include a viewer personal information section and a viewer interest section to prompt the viewer to input viewer identification information. The viewer may use an input device (e.g., remote control, keyboard, etc.) to input viewer identification information (e.g., press a number key on a remote control, on a keyboard, etc.). For example, the graphical user interface 300 may prompt the viewer to input viewer personal information including name, address, age, gender, education, profession, income of the viewer and/or other personal information associated with the viewer. Also, the graphical user interface 300 may prompt the viewer to input the viewer interest by checking the box next to the listed areas of interests. Furthermore, the viewer may input areas of interest that are not listed in the area of interest section of the graphical user interface 300. In addition, the graphical user interface 300 may periodically (e.g., every month, every year) prompt the viewer to update the viewer identification information.

The graphical user interface 300 may transfer the viewer identification information to the viewer database module 206 and/or the filter module 208. The viewer database module 206 and/or the filter module 208 may store the viewer identification information. Also, the graphical user interface 300 and/or the viewer database module 206 may transfer the viewer identification information to the viewer server 110. Further, the graphical user interface 300 may prompt the viewer to instruct the set top box 102 on how long to retain the viewer identification information (e.g., personal information, viewer interests). The length of time may be adjusted based on a number of days, weeks, months, years etc. in which the viewer wishes to retain the viewer identification information. At the end of the viewer instructed period, the graphical user interface 300 may prompt the viewer to enter updated viewer identification information.

Figure 4:
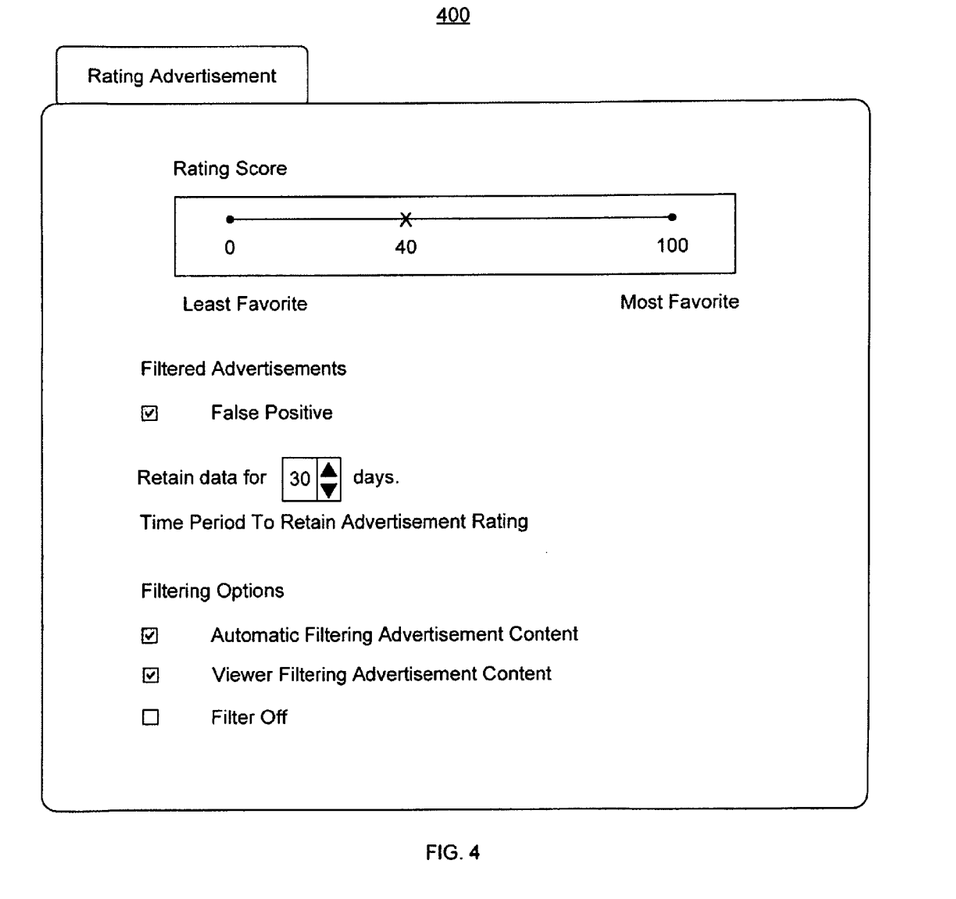
FIG. 4 illustrates a graphical user interface for rating one or more advertisement content segments in accordance with exemplary embodiments.

FIG. 4 illustrates a graphical user interface for rating one or more advertisement content segments in accordance with exemplary embodiments. The graphical user interface 400 may enable a viewer to provide viewer feedback information to the filter module 208 and/or viewer database module 206. For example, the graphical user interface 400 may permit a viewer to select one or more advertisement content segments to be displayed to the viewer. The graphical user interface 400 may also enable a viewer to rate one or more advertisement content segments. In an exemplary embodiment, the graphical user interface 400 may present the viewer with three filtering options. The first filtering option may permit the viewer to instruct the set top box 102 to automatically filter one or more advertisement content segments and to cause the display device 104 to display the one or more advertisement content segments. A notification icon may notify a viewer each time an advertisement content segments is filtered out. For example, the notification icon may be a small screen overlay that is displayed at the display device 104 to indicate that the advertisement content segment has been filtered out. In the event that the viewer may be interested in the filtered out advertisement content segments, the viewer may cause the filtered out advertisement content segments to be displayed. In the event that the viewer may not be interested in the filtered out advertisement content segments, the set top box 102 may filter the next advertisement content segment.

In the second filter option, the viewer may instruct the filter module 208 to display a notification for filtering one or more advertisement content segments that the viewer is not interested. Selecting the second filter option may instruct the filter module 208 not to remove the advertisement content segment from the media stream unless the viewer presses an action key on a user input device (e.g., a remote control). The action key may be a button on a remote control, keyboard, or the user input device communicatively coupled to the set top box 102. Pressing the action key on the input device may communicate a feedback signal to the set top box 102. For example, a viewer may be watching a television program and may press an action key on a remote control to send a feedback signal to the set top box 102. Pressing the action key may indicate that the viewer agrees with the filtering of the filter module 208 and may instruct the filter module 208 to filter out the advertisement content segment. The feedback signal may be transmitted to the viewer database module 206 and/or the filter module 208. The feedback information transmitted by the feedback signal may be stored in the viewer database module 206 to record the viewer feedback information. The feedback information may also update the filter module 208 to accurately filter an advertisement content segment to be displayed to the viewer, and thereby preventing future display of irrelevant advertisement content segments.

In the third filter option, the viewer may instruct the filter module 208 not to filter any advertisement content segments. Selecting this filter option may turn-off the filter module 208 and not perform any filtering of the media stream.

Moreover, the graphical user interface 400 may prompt a viewer to input information to instruct the filter module 208 on how to respond after an advertisement content segment is filtered. For example, the viewer may identify false positives based on pressing an action key to send a false positive signal to the set top box 102 to mark a filtered advertisement content segments as being a false positive. Marking the filtered advertisement content segments as a false positive may indicate that the filter module 208 improperly did not identify a viewer interested advertisement content segment. Once the false positive signal is received, the viewer database module 206 and/or the filter module 208 may record the false positive signal. The filter module 208 may update and/or revise the method of filtering one or more advertisement content segments based at least in part on the false positive signal. Updating the filter module 208 may prevent the filter module 208 from removing future instances of false positive filtered advertisement content segments from the media stream. Thus, preventing the filter module 208 from filtering advertisement content segments having one or more categories similar to those of the filtered advertisement content segments.

After receiving the feedback signals identifying false positives, the viewer interface module 210 may update the viewer aggregate viewer information stored in the viewer database module 206 to filter the advertisement content segment. In an exemplary embodiment, the viewer database module 206 may transmit the updated viewer aggregate viewer information to the filter module 208 to remove future instances of the false positive filtered advertisement content segments from the media stream.

The viewer interface module 210 may present the graphical user interface 400 to prompt the viewer to rate one or more advertisement content segments filtered by the filter module 208. In an exemplary embodiment, the graphical user interface 400 may prompt the viewer to rate one or more advertisement content segments filtered by the filter module 208. The viewer may use an input device (e.g., remote control, keyboard, etc.) to select a rating (e.g., press a number key on a remote control, on a keyboard, etc.). For example, the graphical user interface 400 may include a scale from zero to one hundred for the rating. A rating score of zero may indicate that the viewer is not interested in the filtered advertisement content segments. A rating score of one hundred may indicate that the viewer is interested in the filtered advertisement content segments. In the example depicted in FIG. 4, the user has selected a rating score of 40. It is noted that the rating score may correspond to ranges other than between zero and one hundred, and also may include the selections of non-numerical options that may be converted to a numerical rating score (e.g., one or more categories). The viewer interface module 210 may transfer the rating score to the viewer database module 206 and/or the filter module 208.

The graphical user interface 400 may prompt the viewer to instruct the set top box 102 on how long to retain the rating scores associated with the one or more advertisement content segments in the viewer database module 206 and/or the filter module 208. The length of time may be adjusted based on a number of days, weeks, months etc. in which the viewer wishes to retain the rating scores. Additionally, for a viewer who selects to record the rating score for a period of time, the graphical user interface 400 may present the viewer with an option to retain rating score until the rating score is deleted or until more space is available for storing the rating score in the viewer database module 206 and/or the filter module 208.

Figure 5:
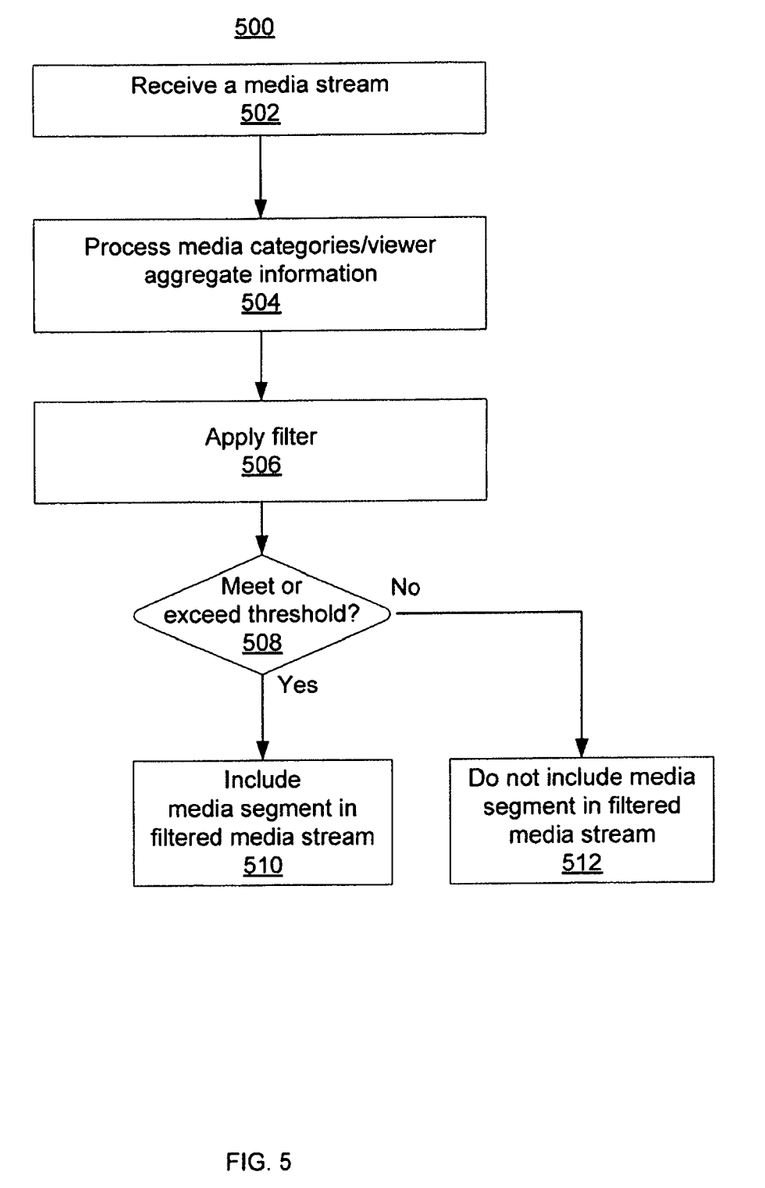
FIG. 5 illustrates a flow diagram of a method for interactively shaping advertisement in a media stream in accordance with exemplary embodiments.

FIG. 5 illustrates a flow diagram of a method for interactively shaping advertisement in a media stream in accordance with exemplary embodiments. This exemplary method is provided by way of example, as there are a variety of ways to carry out methods disclosed herein. The method 500 shown in FIG. 5 can be executed or otherwise performed by one or a combination of various systems. The method 500 is described below as carried out by the system 100 shown in FIGS. 1 and 2 by way of example, and various elements of the system 100 are referenced in explaining the example method of FIG. 5. Each block shown in FIG. 5 represents one or more processes, methods, or subroutines carried in the exemplary method 500. Referring to FIG. 5, the exemplary method 500 may begin at block 502.

At block 502, the set top box 102 may receive a media stream from the content provider 106 via the network 108. In an exemplary embodiment, a communication module 202 of the set top box 102 may receive the media stream via the network 108. Also, the set top box 102 may receive viewer aggregate viewer information from the viewer server 110 via the network 108. The aggregate viewer information may include viewer identification information and/or feedback information. The method 500 may continue to block 504.

At block 504, the media database module 204 of the set top box 102 may process one or more categories/category scores associated with each media segment included in the received media stream. For example, the media database module 204 may process one or more categories/category scores of a media segment assigned by the content provider 106. In the event that the content provider 106 did not assign one or more categories/category scores to each media segment in the media stream, the media database module 204 may assign one or more categories/category scores to each media segment of the media segment. The aggregate viewer information may be transferred to the viewer database module 206 at the set up box 102. The viewer database module 206 may compare the received aggregate viewer information with viewer information stored in the viewer database module 206. In the event that the viewer information stored in the viewer database module 206 is more current, the viewer database module 206 may update the received aggregate viewer information with the viewer information stored in the viewer database module 206. The method 500 may continue to block 506.

At block 506, the filter module 208 may apply a filter to the media segments. The filter module 208 may apply the filter to the received media segments based at least in part on the one or more categories/category scores associated with the media segment and/or the aggregate viewer information. The method 500 may continue to block 508.

At block 508, the filter module 208 may apply a probability distribution function (pdf) to filter the media segments. The filter module 208 may utilize the probability distribution function (pdf) to calculate the likelihood that a viewer will want to view one or more advertisement content segments in the media segments. For example, if the calculated probability meets or exceeds the threshold probability value, the method 500 may continue to block 510. If the calculated probability does not meet or exceed the threshold, the method 500 may continue to block 512.

At block 510, the filter module 208 may include the media segment in the filtered media stream. The display module 212 of the set top box 102 may cause the display of the filtered media stream at the display device 104. This branch of the method 500 may end. Returning to block 508, the method 500 may continue to block 512.

At block 512, the filter module 208 may remove the media segment and may not include the media segment in the filtered media stream. The display module 212 of the set top box 102 may cause the display of the filtered media stream at the display device 104 without the media segment. Also, the display module 212 may cause the display a notification icon to the viewer of the filtered media segment not included in the media stream. This branch of the method 500 may end.

Figure 6:
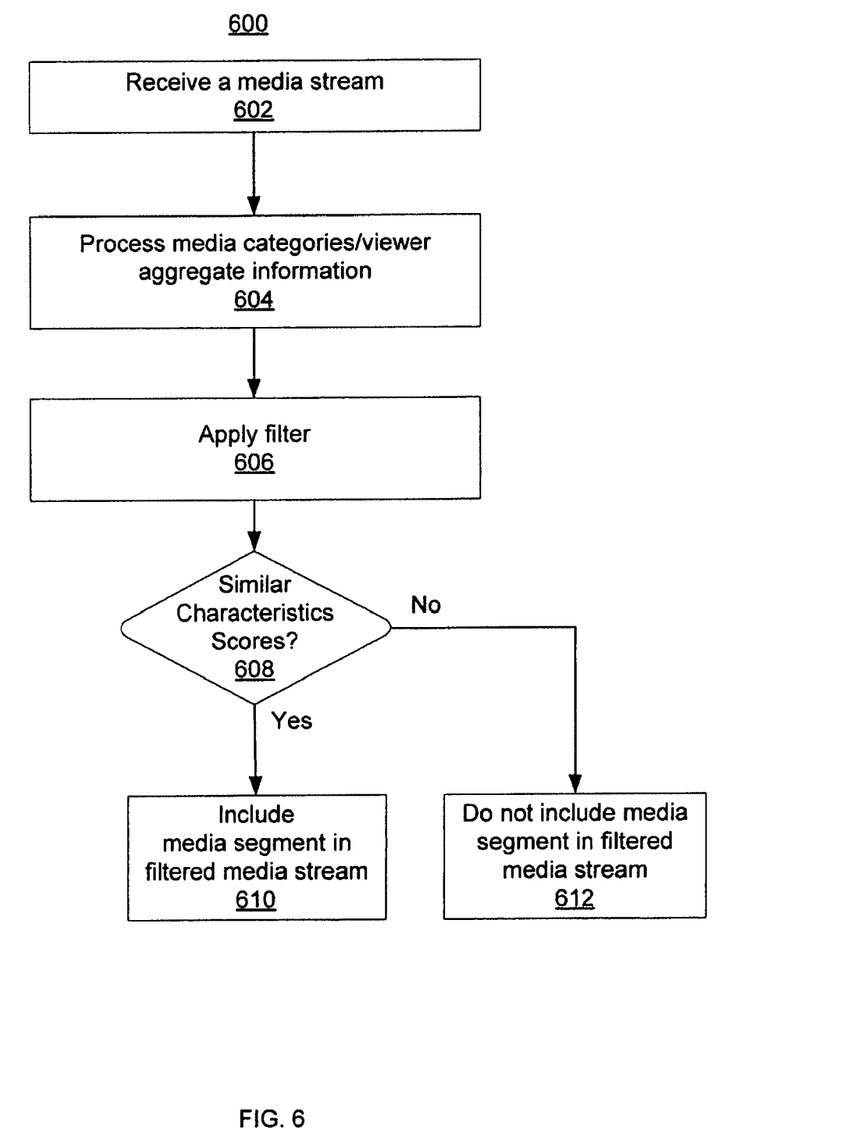
FIG. 6 illustrates another flow diagram of a method for interactively shaping advertisement in a media stream in accordance with exemplary embodiments.

FIG. 6 illustrates a flow diagram of a method for interactively shaping advertisement in a media stream in accordance with exemplary embodiments. This exemplary method is provided by way of example, as there are a variety of ways to carry out methods disclosed herein. The method 600 shown in FIG. 6 can be executed or otherwise performed by one or a combination of various systems. The method 600 is described below as carried out by the system 100 shown in FIGS. 1 and 2 by way of example, and various elements of the system 100 are referenced in explaining the example method of FIG. 6. Each block shown in FIG. 6 represents one or more processes, methods, or subroutines carried in the exemplary method 600. Referring to FIG. 6, the exemplary method 600 may begin at block 602.

At block 602, the set top box 102 may receive a media stream from the content provider 106 via the network 108. In an exemplary embodiment, a communication module 202 of the set top box 102 may receive the media stream via the network 108. Also, the set top box 102 may receive aggregate viewer information from the viewer server 110 via the network 108. The aggregate viewer information may include viewer identification information and/or feedback information. The method 600 may continue to block 604.

At block 604, the media database module 204 of the set top box 102 may process one or more categories/category scores associated with each media segment included in the received media stream. For example, the media database module 204 may process one or more categories/category scores of a media segment assigned by the content provider 106. In the event that the content provider 106 did not assign one or more categories/category scores to each media segment in the media stream, the media database module 204 may assign one or more categories/category scores to each media segment of the media segment. The aggregate viewer information may be transferred to the viewer database module 206 at the set up box 102. The viewer database module 206 may compare the received aggregate viewer information with viewer information stored in the viewer database module 206. In the event that the viewer information stored in the viewer database module 206 is more current, the viewer database module 206 may update the received aggregate viewer information with the viewer information stored in the viewer database module 206. The method 600 may continue to block 606.

At block 606, the filter module 208 may apply a filter to the media segments. The filter module 208 may apply the filter to the received media segments based at least in part on the one or more categories/category scores associated with the media segment and/or the aggregate viewer information. The filter module 208 of the set top box 102 may receive and compare the categories/category scores of the current media segment with the aggregate viewer information received from the viewer database module 206. The method 600 may continue to block 608.

At block 608, if the filter module 208 determines the categories/category scores associated with the media segment is similar to the aggregate viewer information, the method 600 may continue to block 610. If the filter module 208 determines that the categories/category scores associated with the media segment is not similar to the aggregate viewer information, the method 600 may continue to block 612.

At block 610, the filter module 208 may include the media segment in the filtered media stream. The display module 212 of the set top box 102 may cause the display of the filtered media stream at the display device 104. This branch of the method 600 may end. Returning to block 608, the method 600 may continue to block 612.

At block 612, the filter module 208 may remove the media segment and may not include the media segment in the filtered media stream. The display module 212 of the set top box 102 may cause the display of the filtered media stream at the display device 104 without the media segment. Also, the display module 212 may cause the display a notification icon to the viewer of the filtered media segment not included in the media stream. This branch of the method 600 may end.

Figure 7:
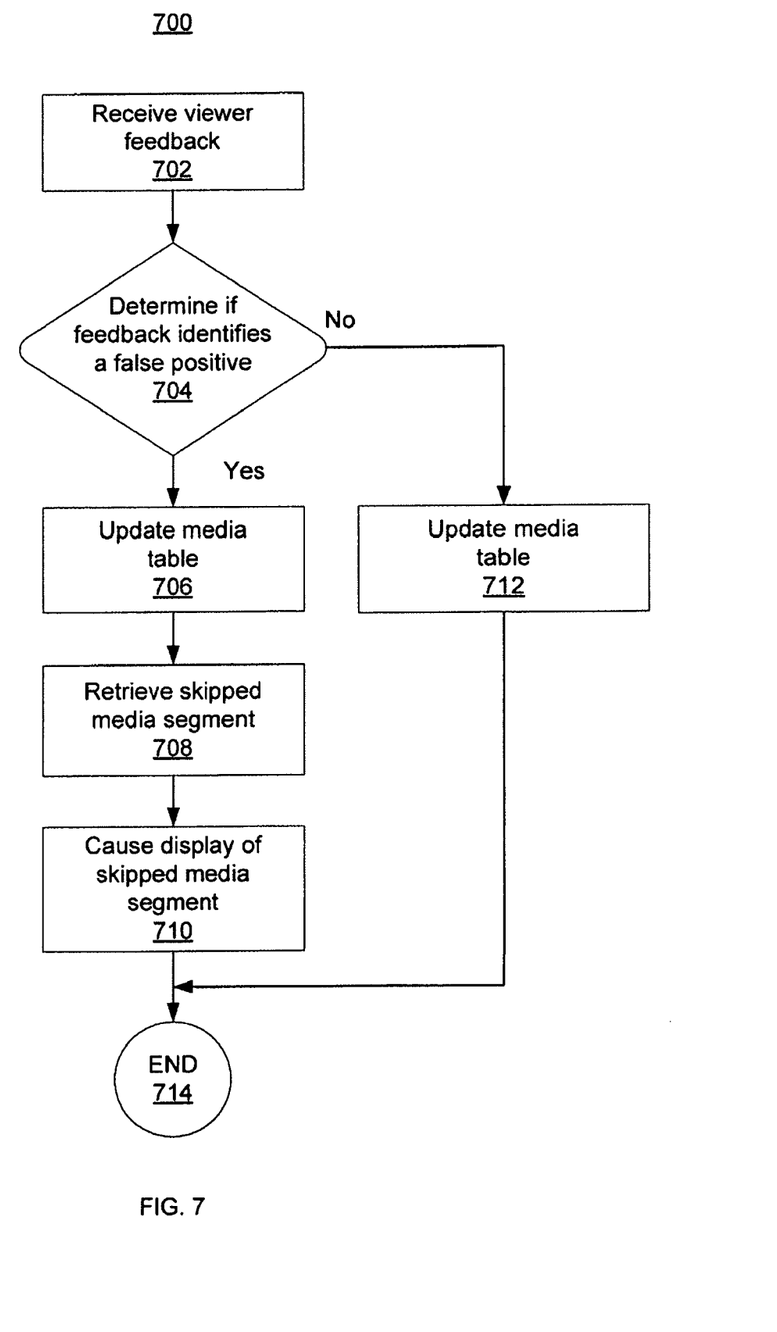
FIG. 7 illustrates a method for processing feedback from a viewer in accordance with exemplary embodiments.

FIG. 7 illustrates a method for processing feedback from a viewer in accordance with exemplary embodiments. This exemplary method is provided by way of example, as there are a variety of ways to carry out methods disclosed herein. The method 700 shown in FIG. 7 can be executed or otherwise performed by one or a combination of various systems. The method 700 is described below as carried out by the system 100 shown in FIGS. 1 and 2 by way of example, and various elements of the system 100 are referenced in explaining the example method of FIG. 7. Each block shown in FIG. 7 represents one or more processes, methods, or subroutines carried in the exemplary method 700. The method 700 may begin at block 702.

At block 702, the method 700 may include receiving a feedback signal containing feedback information from a user input device associated with a viewer. In an exemplary embodiment, a viewer may use an input device such as, but not limited to, a remote control to generate the feedback signal. The set top box 102 may receive the feedback signal at a receiver module 214, and a viewer interface module 210 may process the feedback signal. The method 700 may continue to block 704.

At block 704, the viewer interface module 210 may determine feedback information provided by the viewer. For example, the viewer interface module 210 may determine a rating score for one or more media segments, whether the feedback signal identifies a false positive, filter option selected by the viewer, and/or a retention period for the feedback information. The feedback information may update the one or more categories/category scores and/or a probability distribution function (pdf) associated with the viewer. In the event that the feedback information contains a false positive, the method 700 may continue to block 706. If the feedback information does not contain a false positive, the method 700 may continue to block 712.

At block 706, the viewer interface module 210 may communicate the feedback information to the viewer database module 206 and/or the filter module 208. The feedback information may update the one or more categories/category scores associated with the media segment and/or the viewer. The feedback information may indicate that the filtered out media segment is interested by the viewer. In future instances when the filter module 208 encounters a media segment having similar categories/category scores, the filter module 208 may not filter out the media segment from the media stream. The method 700 may continue to block 708.

At block 708, the filter module 208 may retrieve the filtered out media segment from the media database module 204 and may output the filtered media stream to the display module 212 beginning at the retrieved media segment. The display module 212 may cause the display of the filtered media segments by inserting the previously filtered media segments back into the media stream. The method 700 may continue to block 710.

At block 710, the display module 212 may cause the display of the filtered media segment at the display device 104. The method 700 may continue to block 714 and this branch of the method 700 may end. Returning to block 704, the method 700 may continue to block 712.

At block 712, the viewer interface module 210 may communicate the feedback information to the viewer database module 206 and/or the filter module 208. The feedback information may update the one or more categories/category scores associated with the media segment and/or the viewer. The feedback information may indicate that the filtered out media segment is not interested by the viewer. The feedback information may update the viewer database module 206 and/or the filter module 208 such that future instances of similar media segments are filtered out from the media stream as well by the filter module 208. The method 700 continues to block 714 and ends.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method comprising:
providing a media stream via a network, the media stream comprising one or more advertisement content segments;
identifying aggregate information associated with a viewer;
assigning the one or more advertisement content segments to one or more categories and an advertising category score associated with the one or more categories, wherein the advertising category score represents an indication of relevancy of the one or more advertisement content segments to the one or more categories;
filtering the one or more advertisement content segments based at least in part on at least one of the one or more categories, the advertising category score associated with the one or more categories and the aggregate information associated with the viewer;
outputting an advertisement content segment from the filtered one or more advertisement content segments to the viewer;
receiving a rating value from the viewer, and as specified by the viewer, for the advertisement content segment output to the viewer, wherein the rating value is received based on the viewer's selection of a rating in a graphical user interface associated with the advertisement content segment; and
updating the aggregate information associated with the viewer based on the rating value.

2. The method of claim 1, further comprising:
receiving a false positive signal associated with at the least one of the one or more advertisement content segments from the viewer, wherein the false positive signal is received based on the viewer's selection of a false positive filter option in the graphical user interface associated with the at least one of the one or more advertisement content segments; and
updating the aggregate information associated with the viewer based on the false positive signal.

3. The method of claim 2, further comprising preventing a future instance of the one or more advertisement media content segments from being removed from the media stream if the one or more advertisement content media segments is associated with a false positive signal.

4. The method of claim 2, further comprising preventing a future advertisement media content segment from being removed from the media stream if the future advertisement media content segment is associated with one or more categories that are similar to the one or more categories of the one or more advertisement content segments associated with a false positive signal.

5. The method of claim 1, further comprising:
removing one of the one or more advertisement content segments from the media stream based on the viewer's selection of a key on a user device; and
updating the aggregate information associated with the viewer based on the viewer's selection.

6. The method of claim 1, further comprising:
prompting the viewer to select how long the rating value should be retained via the graphical user interface; and
saving the rating value associated with the least one of the filtered one or more advertisement content segments at a data storage.

7. The method of claim 1, further comprising removing the one or more advertisement media content segments from the media stream in the event of the probability of the viewer wanting to view the one or more advertisement content segments does not meet or exceed a threshold probability value.

8. The method of claim 1, wherein filtering the one or more advertisement content segments comprises comparing at least one of the one or more categories and the advertising category score associated with the one or more categories with the aggregate information associated with the viewer.

9. The method of claim 8, further comprising removing the one or more advertisement media content segments from the media stream in the event of at least one of the one or more categories and the advertising category score associated with the one or more categories does not match the aggregate information associated with the viewer.

10. The method of claim 1, wherein filtering the one or more advertisement content segments comprises displaying at least one of test advertisement content segments and new advertisement content segments to the viewer.

11. A system comprising:
a content provider configured to provide a media stream via a network, the media stream comprising one or more advertisement content segments;
a viewer server to identify aggregate information associated with a viewer;
a media database module to assign the one or more advertisement content segments to one or more categories and an advertising category score associated with the one or more categories, wherein the advertising category score represents an indication of relevancy of the one or more advertisement content segments to the one or more categories;
a filter module to filter the one or more advertisement content segments based at least in part on at least one of the one or more categories, the advertising category score associated with the one or more categories and the aggregate information associated with the viewer;
a display module to output an advertisement content segment from the filtered one or more advertisement content segments to the viewer; and
a receiver to receive a rating value from the viewer, and as specified by the viewer, for the advertisement content segment output to the viewer, wherein the rating value is received based on the viewer's selection of a rating in a graphical user interface associated with the advertisement content segment,
wherein the viewer server updates the aggregate information associated with the viewer based on the rating value.

12. The system of claim 11, further comprising:
the receiver to receive a false positive signal associated with at the least one of the one or more advertisement content segments from the viewer, wherein the false positive signal is received based on the viewer's selection of a false positive filter option in the graphical user interface associated with the at least one of the one or more advertisement content segments; and
the viewer server to update the aggregate information associated with the viewer based on the false positive signal.

13. The system of claim 12, wherein the filter module prevents a future instance of the one or more advertisement media content segments from being removed from the media stream if the one or more advertisement content media segments is associated with a false positive signal.

14. The system of claim 12, wherein the filter module prevents a future advertisement media content segment from being removed from the media stream if the future advertisement media content segment is associated with one or more categories that are similar to the one or more categories of the one or more advertisement content segments associated with a false positive signal.

15. The system of claim 11, wherein the filter module removes one of the one or more advertisement content segments from the media stream based on the viewer's selection of a key on a user device, wherein the viewer server updates the aggregate information associated with the viewer based on the viewer's selection.

16. The system of claim 11, wherein the display module prompts the viewer to select how long the rating value should be retained via the graphical user interface, wherein the viewer server saves the rating value associated with the least one of the filtered one or more advertisement content segments at a data storage.

17. The system of claim 11, wherein the filter module removes the one or more advertisement media content segments from the media stream in the event of the probability of the viewer wanting to view the one or more advertisement content segments does not meet or exceed a threshold probability value.

18. The system of claim 11, wherein the filter module compares at least one of the one or more categories and the advertising category score associated with the one or more categories with the aggregate information associated with the viewer.

19. The system of claim 18, wherein the filter module removes the one or more advertisement media content segments from the media stream in the event of at least one of the one or more categories and the advertising category score associated with the one or more categories does not match the aggregate information associated with the viewer.

20. The system of claim 11, wherein the display module displays at least one of test advertisement content segments and new advertisement content segments to the viewer.

* * * * *